United States Patent Office 3,220,470
Patented Nov. 30, 1965

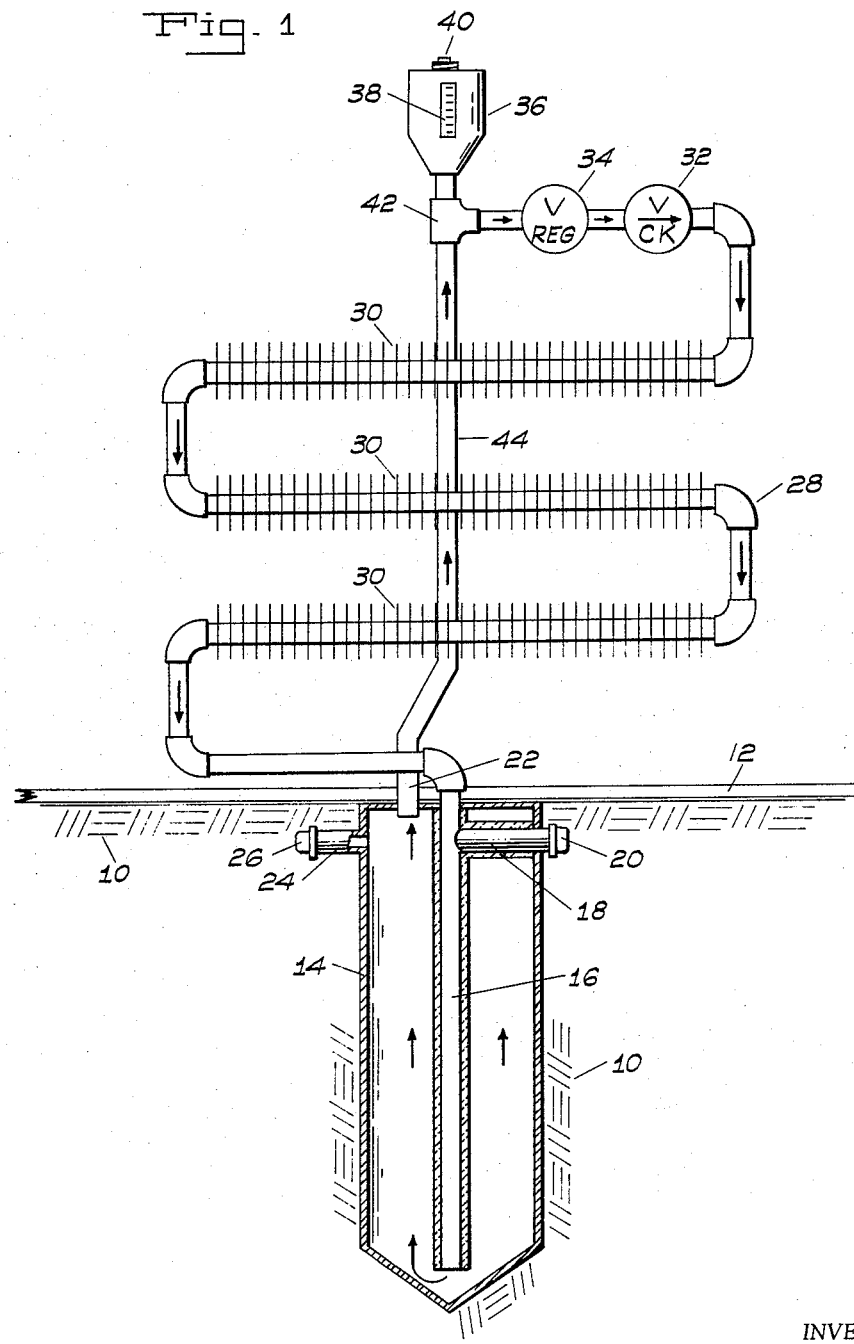

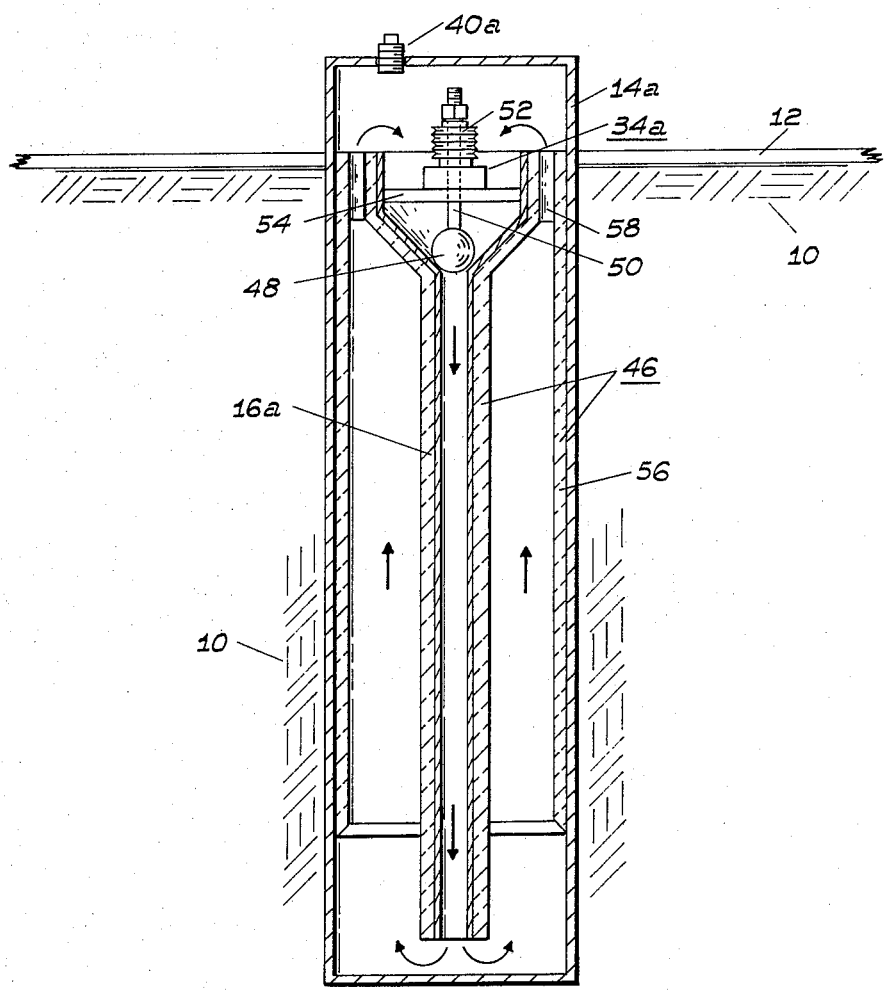

3,220,470
SOIL REFRIGERATING SYSTEM
Joseph C. Balch, Mile 34 Richardson Highway,
Fairbanks, Alaska
Filed Oct. 8, 1962, Ser. No. 228,897
6 Claims. (Cl. 165—40)

This invention relates generally to a liquid filled system useful in the maintenance of soil surrounding footings and foundations frozen. It relates more specifically to liquid filled apparatus, wherein heat transfer is accomplished to the ambient air from the surrounding soil whereby the soil remains in the frozen condition.

A great amount of difficulty has been encountered in the past in attempting to build permanent structures in the arctic and subarctic regions of the world due to the presence of permafrost. As is well known, this condition is widespread in these regions and has led to the partial or complete destruction of many large buildings, particularly in abnormally warm weather during which the permafrost begins to thaw.

In areas where the permafrost layer is relatively thin, pilings have been driven into firm soil thereunder. This solution is not altogether satisfactory, however, because in some areas the permafrost may reach to a depth of 1000 feet or more. Another method which has been used is to construct the building upon timber sills laid out on the tundra. Leaving the tundra intact over the permafrost aids in preventing its thawing but, obviously, this method of construction is not always practical. The above described method can be used effectively for smaller structures, but large buildings, radar installations, communication towers, etc., require stronger and generally deeply embedded foundations.

The primary object of my invention is to provide a simple, relatively inexpensive apparatus which will permit such foundations to be constructed by permanently freezing the soil or permafrost in which they are laid.

Another object of my invention is to provide an improved apparatus which requires few, if any, moving parts while at the same time providing for the highly efficient and permanent freezing of the permafrost zone surrounding the apparatus.

A still further object of my invention is to provide an improved liquid-filled apparatus which when embedded in the soil removes heat therefrom and transfers the heat thus removed, by means of heat exchangers, to the surrounding ambient air whereby the soil is maintained in a permanently frozen condition.

Generally, my invention provides an improved apparatus including means embedded into the soil or permafrost zone whereby heat is removed therefrom, means for transferring the heat thus removed to the ambient air, and a liquid heat transfer medium filling said apparatus.

Other, further, and additional objects and advantages of the invention will become more apparent as the following description is read in conjunction with the accompanying drawing wherein like reference characters denote like parts in all views and wherein:

FIGURE 1 is a view partly in elevation and partly in cross-section of apparatus constructed in accordance with the invention illustrated as being partially embedded in the soil or permafrost.

FIGURE 2 is a cross-sectional view of an alternate form of the apparatus also constructed in accordance with the invention.

Referring first to FIGURE 1, the apparatus is shown therein as it would be positioned during its actual operation.

Insulation 12, which may be an artificial material or natural tundra, is distributed over the area surrounding the apparatus to prevent heat transfer between the soil and the air and to help prevent the direct absorption of heat from the atmosphere.

A hollow casing 14 is embedded in the soil or permafrost. The casing 14 is closed at each end and has an insulated inlet pipe 16 extending through the top end and terminating near the bottom closure of casing 14. An insulated inlet pipe 18 connected with the inlet pipe 16 extends through the upper sidewall of the casing 14. A pipe cap or plug 20 is illustrated as closing the free end of the pipe 18. The pipe 18 serves as an alternate connection should the installation prohibit the top connection method. In this case, the uppermost end of the inlet pipe 16 could be closed.

A return flow pipe 22 also extends through the top end of the casing 14. The return flow pipe 22 extends only a very short distance in the casing 14. An alternate return flow pipe 24 is illustrated as extending through and terminating just inside the upper sidewall of the casing 14. The free end of pipe 24 is provided with a cap or plug 26. Should the alternate return pipe 24 be used, the return pipe 22 would be closed and the return connection be made to pipe 24.

Connected to the inlet pipe 16 is a heat exchanger 28 which may contain one or more heat transfer members 30 interconnected by the necessary pipes and pipe fittings. The upper or inlet end of the heat exchanger 28 is connected with a check valve 32. Check valve 32 is constructed whereby fluid can pass therethrough only in the direction indicated by the arrow thereon as shown in FIGURE 1. Connected with the check valve 32 is a regulating or throttling valve 34 which is adapted to control the volume of liquid passing therethrough. It should be pointed out that a single valve combining the features of both the check valve 32 and the regulating valve 34 may be used if desired.

Valve 34 is connected with a pipe 44 and a liquid reservoir 36 by means of the T-fitting 42. Pipe 44 is connected at its lower end with the return flow pipe 22 which, as previously described extends into the casing 14.

Reservoir 36 is adapted to contain a portion of the heat transfer liquid with which the apparatus is filled. A sight glass 38 is provided in the reservoir whereby one can ascertain visually whether the apparatus contains the proper amount of liquid. Filler cap or plug 40 is provided on the top of the reservoir 36 so that liquid can be added to the apparatus should the need arise.

Low boiling point liquids, such as some of the refrigerant liquids, as well as high boiling point liquids, such as ethylene glycol or ethylene glycol base liquids have been used to fill the system. Ordinary gasoline has also been successfully used in the system. Those used have worked with the main difference being the efficiency of the system.

The form of the apparatus illustrated in FIGURE 2 lends itself to simplified manufacturing and production technique. Shown therein is a hollow casing 14a embedded in soil or permafrost 10. Within casing 14a is mounted an insert 46 which includes an inlet pipe 16a and a bellows controlled valve mechanism 34a. Insert 46 is preferably constructed of a plastic material that will inherently provide the required insulation. It may be constructed of any other suitable material and have separate insulation placed thereon.

Casing 14a extends upwardly through the tundra or artificial insulation 12. The upper portion thereof, above the insert 46 serves as a heat exchanger to the atmosphere as did exchanger 30 of FIGURE 1.

Insert 46 also includes a sleeve portion 56 which extends downwardly from the valve mechanism 34a concentrically with casing 14a. It is so constructed that it provides an insulation between the casing 14a and the interior thereof for a sufficient length of the casing 14a to separate the lower heat transfer zone adjacent the soil from an upper heat transfer zone adjacent the atmosphere.

A plurality of passageways 58 are provided through insert 46 to permit fluid flow from the lower zone into the upper zone.

The valve mechanism 34a includes a ball valve member 48 adapted to form a seal with the upper end of inlet pipe 16a. Valve member 48 has a stem portion 50 extending upwardly and joining with a bellows 52. Bellows 52 is mounted on cross member 54 which is joined at either end with the interior of the insert 46.

The upper and lower ends of the casing 14a are closed. A plug 40a is provided so that the system can be filled or the fluid replenished should there be an inadvertent loss of the fluid. As was true with the system illustrated in FIGURE 1, this system is also filled and preferably sealed. A completely filled and sealed system permits pressurizing the fluid therein and provides an increase in boiling point of the fluid should low boiling point fluids be used.

The operation of my apparatus is extremely simple. The casing 14 is embedded in the permafrost 10 near the foundation of the building or other structure. After the insulation 12 has been positioned and the apparatus filled with the liquid, the heat from the soil 10 surrounding the casing 14 is transferred to the liquid. As the temperature of the liquid rises, thermal flow of the liquid begins.

The warmer, lighter-weight liquid begins to rise to the top of the casing 14 and is replaced by cooler liquids from the insulated inlet pipe 16. The insulation on inlet pipe 16 is provided to increase the efficiency of the system by retarding heat transfer from the warmer liquids in casing 14 to the cool or cold liquids in pipe 16.

As the thermal flow progresses, the warmer liquid moves through return pipe 22 into pipe 44, through the regulator valve 34. Regulator valve 34 is adjustable whereby the volume of liquid flowing can be controlled, thus controlling to some extent the rate of cooling.

From the regulator valve 34, the liquid flows through the check valve 32 and into the heat exchanger 28. The check valve 32 prevents the possibility of a reverse flow occurring in the system since liquid can pass therethrough in one direction only.

In the heat exchanger 28 the warm liquid is brought into contact with the highly conductant and large surface areas of the heat transfer members 30. Cold air surrounding the heat transfer members 30 absorbs the heat from the warm liquid therein, thus cooling the liquid. The liquid, which now has been cooled, returns to the casing 14 through the inlet pipe 16.

The operation of the alternate form of the apparatus as illustrated in FIGURE 2 is also relatively simple. After the casing 14a has been installed as illustrated, heat from the soil or permafrost is transferred to the fluid in the lower portion of casing 14a. As the temperature of the fluid increases, the fluid begins to rise in casing 14a, passing through the passageways 58 and into the upper zone of casing 14a. Heat from the fluid is then transferred to the atmosphere through the wall of casing 14a.

The volume of fluid flow in the system will be regulated by the position of the valve member 48 relative to the inlet pipe 16a. The initial position can be adjusted so that a desired flow rate can be obtained at a certain temperature range. The bellows 52 can be connected either to close or open the valve member 48 with a rise or drop in the temperature of the fluid. Connecting the valve member 48 to the top of the bellows 52 with the bottom of the bellows attached to the cross member 54 as shown in FIGURE 2 results in movement of the valve member 48 away from the inlet pipe 16a as the environment surrounding the bellows becomes relatively warmer. The bellows 52 expands longitudinally to move the valve member due to the expansion of a thermally responsive fluid contained in the bellows 52. With the valve mechanism 34 installed in the apparatus in this manner, a higher flow rate and thus a higher heat transfer rate will occur at relatively warmer temperatures of the fluid in the upper portion of the casing 14a so that maximum advantage can be taken of the minimum of heat transfer in the upper zone.

Cold fluid in the upper portion of the casing 14a then flows downwardly through insulated inlet pipe 16a to a point near the bottom of the casing 14a, thus completing the refrigeration cycle.

From the foregoing description, it should be apparent that apparatus constructed in accordance with my invention is novel, is very reliable, and relatively economical to manufacture and operate.

The specific apparatus described herein is by way of example only and many changes and variations may be made thereto without departing from the spirit of the invention or from the scope of the annexed claims.

What I claim is:

1. Refrigeration apparatus comprising:
   (1) a hollow elongated member having upper and lower closed ends,
   (2) a fluid substantially filling said hollow elongated member,
   (3) an insertable member adapted to be positioned within said hollow elongated member at a position remote from either end, said insertable member having
      (a) a circumferential sleeve-like insulation portion having its exterior contiguous with the interior of said hollow elongated member and extending along a portion of the length of said hollow elongated member, the ends of said sleeve-like portion being spaced from the ends of said hollow elongated member to leave spaces adjacent the ends thereof in an uninsulated status,
      (b) a tube-like portion of lesser diameter than said sleeve-like portion extending to a point adjacent said lower closed end,
      (c) means joining said sleeve-like portion and said tube-like portion, said means having at least one passageway extending therethrough, and
      (d) valve means therein adapted to control the flow of fluid through said tube-like portion, said fluid flow resulting solely from the temperature differential existing in the uninsulated spaces adjacent the upper and lower ends of said hollow elongated member.

2. Refrigeration apparatus comprising:
   (1) a hollow elongated member having upper and lower closed ends,
   (2) a fluid substantially filling said hollow elongated member,
   (3) an insertable member adapted to be positioned within said hollow elongated member at a position remote from either end, said insertable member having
      (a) a circumferential sleeve-like insulation portion having its exterior contiguous with the interior of said hollow elongated member and extending along a portion of the length of said hollow elongated member, the ends of said sleeve-like portion being spaced from the ends of said hollow elongated member to leave spaces adjacent the ends thereof in an uninsulated status,
      (b) a tube-like portion of lesser diameter than said sleeve-like portion extending to a point adjacent said lower closed end,
      (c) means joining said sleeve-like portion and said tube-like portion, said means having a plurality of passageway extending therethrough, and
      (d) valve means mounted therein, said valve means including a bellows member connected with a valve member, the arrangement and construction being such that a change in dimension of said bellows in response to changes in the temperature of said fluid moves said valve member toward or away from said tube-like portion to control the flow of fluid therethrough, said flow resulting solely from the temperature differential existing in the uninsulated spaces adjacent the ends of said hollow elongated member.

3. Refrigeration apparatus for freezing or maintaining soil in a frozen state, comprising:

a hollow elongated member having upper and lower closed ends adapted to be located in soil with the upper end projecting above the surface of the soil;

a fluid substantially filling said elongated member;

an insulating sleeve mounted in said elongated member and extending generally from a point corresponding to the surface of the soil to a point spaced from the lower closed end of said elongated member;

a tube-like member mounted in said elongated member and extending axially through said sleeve, said sleeve and tube-like member cooperating to form a substantially uninterrupted annular space;

temperature responsive valve means in said elongated member and mounted to control the flow of fluid through said tube-like member, said valve means being responsive to the temperature of fluid in said elongated member, said fluid flow resulting solely from a temperature differential existing in the fluid in said elongated member between the end projecting above the surface of the soil and the lower closed end located in the soil.

4. The refrigeration apparatus of claim 3 wherein said tube-like member is insulated to retard heat transfer between the annular space and the interior of the tube-like member.

5. Refrigeration apparatus for freezing or maintaining soil in a frozen state, comprising:

a hollow elongated member having upper and lower closed ends adapted to be located in the soil with the upper end projecting above the surface of the soil;

a fluid substantially filling said elongated member;

an insulating sleeve mounted in said elongated member and extending generally from a point corresponding to the surface of the soil to the point spaced from the lower closed end of said elongated member;

a tube-like member including an inverted truncated cone shaped upper end portion forming a valve seat mounted in said elongated member, said tube-like member extending axially through said sleeve, said sleeve and tube-like member cooperating to form a substantially uninterrupted annular space; and, temperature responsive valve means in said elongated member and mounted to control the flow of fluid through said tube-like member, said fluid flow resulting solely from a temperature differential existing in the fluid in said elongated member between the end projecting above the surface of the soil and the lower closed end located in the soil.

6. The refrigeration apparatus of claim 5 wherein said valve means includes a bellows containing a temperature responsive fluid, said bellows being connected with said tube-like member;

a valve member connected with said bellows and movable therewith toward and away from said valve seat in response to temperature changes in the fluid surrounding said bellows.

References Cited by the Examiner

UNITED STATES PATENTS

| | | | |
|---|---|---|---|
| 1,952,198 | 3/1934 | Findley | 236—93 |
| 2,448,881 | 11/1949 | Rogers et al. | 62—99 |
| 2,258,696 | 10/1941 | Betz et al. | 236—93 X |
| 2,881,869 | 4/1959 | Yarrick. | |
| 2,893,706 | 7/1959 | Smith | 165—106 |
| 2,932,313 | 4/1960 | Noland | 165—45 X |

FOREIGN PATENTS

| | | |
|---|---|---|
| 168,024 | 2/1906 | Germany. |
| 601,661 | 5/1948 | Great Britain. |
| 746,856 | 3/1956 | Great Britain. |

CHARLES SUKALO, *Primary Examiner.*

ALDEN D. STEWART, *Examiner.*